(12) United States Patent
Shilane et al.

(10) Patent No.: US 11,200,116 B2
(45) Date of Patent: *Dec. 14, 2021

(54) CACHE BASED RECOVERY OF CORRUPTED OR MISSING DATA

(71) Applicant: EMC IP Holding Company LLC, Hopkinton, MA (US)

(72) Inventors: Philip N. Shilane, Newtown, PA (US); Grant R. Wallace, Pennington, NJ (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 111 days.

This patent is subject to a terminal disclaimer.

(21) Appl. No.: 16/573,210

(22) Filed: Sep. 17, 2019

(65) Prior Publication Data

US 2020/0012559 A1 Jan. 9, 2020

Related U.S. Application Data

(63) Continuation of application No. 16/207,931, filed on Dec. 3, 2018, now Pat. No. 10,430,273, which is a continuation of application No. 14/674,828, filed on Mar. 31, 2015, now Pat. No. 10,146,616.

(51) Int. Cl.
| | |
|---|---|
| *G06F 11/10* | (2006.01) |
| *G06F 12/0831* | (2016.01) |
| *G06F 11/14* | (2006.01) |
| *G06F 12/0895* | (2016.01) |

(52) U.S. Cl.
CPC ........ *G06F 11/1064* (2013.01); *G06F 11/141* (2013.01); *G06F 11/1469* (2013.01); *G06F 12/0833* (2013.01); *G06F 12/0895* (2013.01); *G06F 2201/84* (2013.01); *G06F 2201/87* (2013.01); *G06F 2212/403* (2013.01)

(58) Field of Classification Search
CPC ............ G06F 11/1064; G06F 12/0895; G06F 12/0833; G06F 11/1469; G06F 11/141; G06F 2212/403; G06F 2201/84; G06F 2201/87; G06F 11/1666; G06F 11/2094
See application file for complete search history.

(56) References Cited

U.S. PATENT DOCUMENTS

| | | | |
|---|---|---|---|
| 5,623,595 A | | 4/1997 | Bailey |
| 5,774,643 A | * | 6/1998 | Lubbers .............. G06F 11/1076 711/114 |
| 5,778,167 A | | 7/1998 | Carrel |
| 5,951,691 A | | 9/1999 | Ng |
| 6,243,827 B1 | | 6/2001 | Renner, Jr. |

(Continued)

OTHER PUBLICATIONS

Xie, Tao, and Hui Wang. "Micro: A multilevel caching-based reconstruction optimization for mobile storage systems." IEEE Transactions on Computers 57.10 (2008): 1386-1398.

(Continued)

*Primary Examiner* — Francisco A Grullon
(74) *Attorney, Agent, or Firm* — Workman Nydegger

(57) ABSTRACT

Systems and methods for recovering corrupted data or missing data from a cache are provided. When a data corruption is discovered in a storage system, the cache may be searched to determine if a valid copy of the corrupted data can be recovered from the cache.

20 Claims, 4 Drawing Sheets

(56) References Cited

U.S. PATENT DOCUMENTS

| | | | |
|---|---|---|---|
| 7,069,381 B1* | 6/2006 | Kiselev | G06F 11/1076 711/114 |
| 7,506,213 B1 | 3/2009 | Cabrera, III | |
| 7,680,998 B1 | 3/2010 | Auchmoody | |
| 8,086,911 B1 | 12/2011 | Taylor | |
| 8,327,080 B1 | 12/2012 | Der | |
| 8,417,987 B1* | 4/2013 | Goel | G06F 11/1076 714/6.1 |
| 8,825,937 B2 | 9/2014 | Atkisson | |
| 9,251,003 B1* | 2/2016 | Gupta | G06F 11/1469 |
| 10,430,273 B2* | 10/2019 | Shilane | G06F 11/2094 |
| 2004/0193950 A1 | 9/2004 | Gagne | |
| 2008/0005466 A1* | 1/2008 | Lubbers | G06F 3/0683 711/113 |
| 2011/0029836 A1 | 2/2011 | Dhuse | |
| 2011/0066808 A1 | 3/2011 | Flynn | |
| 2012/0124294 A1 | 5/2012 | Atkisson | |
| 2012/0198174 A1 | 8/2012 | Nellans | |
| 2012/0290873 A1 | 11/2012 | Thornton | |
| 2012/0324150 A1* | 12/2012 | Moshayedi | G06F 3/0619 711/103 |
| 2013/0007531 A1 | 1/2013 | Jibbe | |
| 2013/0185488 A1 | 7/2013 | Talagala | |
| 2013/0262396 A1* | 10/2013 | Kripalani | G06F 16/21 707/674 |
| 2014/0040661 A1* | 2/2014 | Goel | G06F 11/0709 714/6.12 |
| 2014/0181575 A1* | 6/2014 | Kalach | G06F 11/1435 714/6.11 |
| 2014/0281784 A1 | 9/2014 | Verma | |
| 2014/0298135 A1 | 10/2014 | Dhuse | |
| 2016/0011944 A1* | 1/2016 | Jain | G06F 11/1402 707/674 |

OTHER PUBLICATIONS

Wan, Shenggang, et al. "Victim disk first: an asymmetric cache to boost the performance of disk arrays under faulty conditions." Proceedings of the 2011 USENIX conference.

Shamili, K., and P. Golda Jeyasheeli. "Efficient Cache Utilization of Disk Array Failures." International Journal of Innovative Research in Science, Engineering and Technology vol. 3, Special Issue 3, Mar. 2014.

\* cited by examiner

CACHE BASED RECOVERY OF CORRUPTED OR MISSING DATA

FIELD OF THE INVENTION

Embodiments of the present invention generally relate to cache based systems and methods for recovering data. More particularly, embodiments of the invention relate to systems and methods for using data stored in a cache to improve the reliability of a computer system by recovering data that has become corrupted with the version of the data stored in the cache.

BACKGROUND

The reliability and security of data is important to the everyday operations from personal, business, and governmental perspectives. People want immediate access to their data. The ability to quickly access data can be improved through the use of a cache. A cache, such as a flash cache, is a type of memory that is typically quicker to access than some other types of storage. As a result, data stored in a cache can be accessed more quickly than the same data stored on a slower storage device.

In fact, flash caches are becoming a common component of storage systems to accelerate the performance of the storage system. Thus, the performance of the storage system is improved with the addition of a cache.

The reliability of the storage system can be provided by ensuring that the data is backed up or by employing strategies that provide redundancy. By backing up the data or by providing redundancy, data that becomes corrupted can be recovered from the redundant copy. For example, a backup system ensures that the data is protected at a certain point in time. If the source or original data becomes corrupted, a valid copy of data can be recovered from the backup. Other types of redundancy such as RAID systems can be used to recover corrupted data. However, this can be a relatively slow process and time is needed. Although these types of recovery systems provide reliability, systems and methods are needed to reduce the time required to recover corrupted data.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
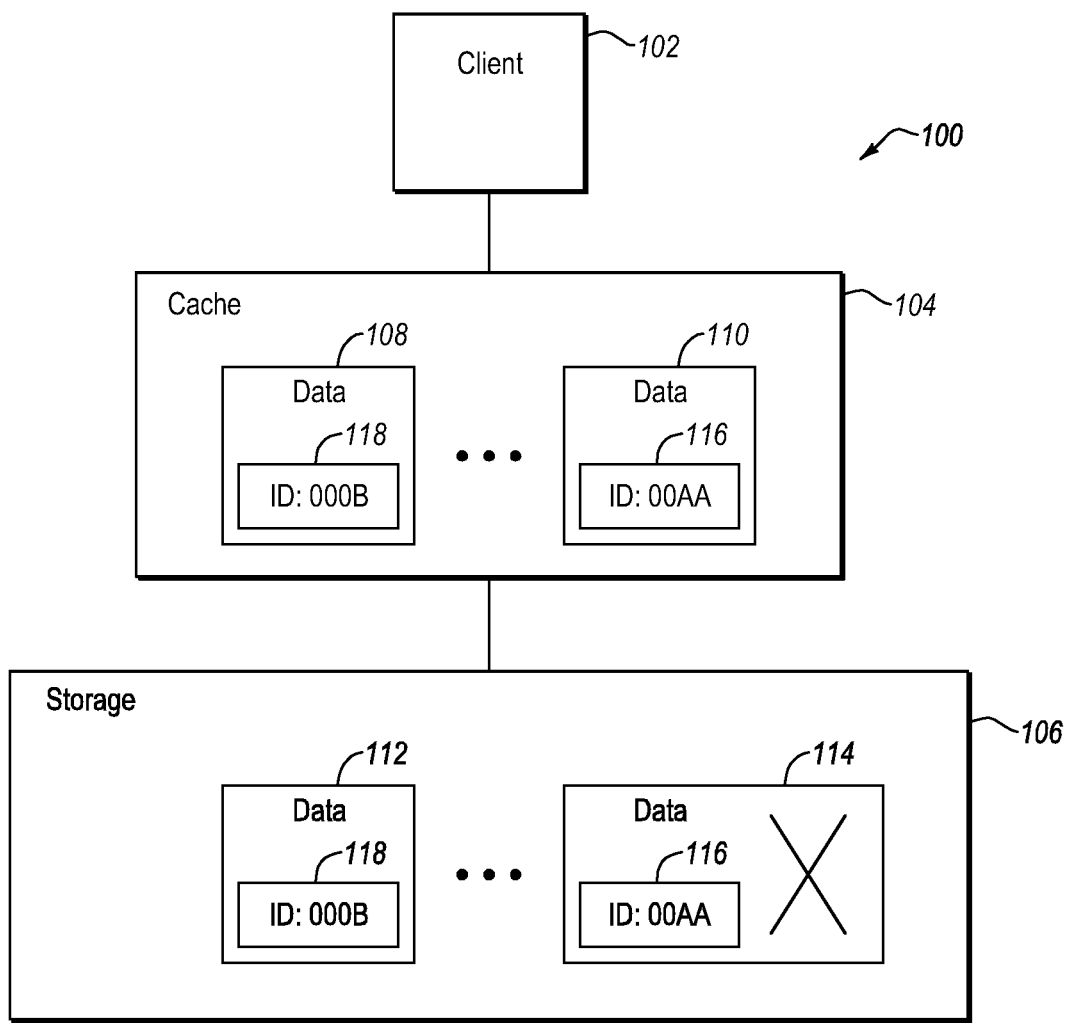
FIG. 1 is an example of a computing system in which corrupted data can be recovered from a cache.

Embodiments of the invention generally relate to systems and methods for recovering data. More specifically, embodiments of the invention further relate to systems and methods for recovering data on a storage device that has become corrupted or is missing. Conventionally, corrupted data can be recovered using the recovery mechanisms associated with RAID (Redundant Array of Independent Disks) or error correcting codes. While corrupted or missing data can be recovered using these methods, embodiments of the invention relate to cache based systems and methods for recovering data.

When corrupted data is identified, a search for the missing or corrupted data is made of data stored in a cache. If the corrupted or missing data is present in the cache, the data can be recovered more quickly compared to conventional recovery. As used herein and by way of example, corrupted data indicates data that is corrupted, missing, not available, inaccessible, or the like or combination thereof. Corrupt data can be identified, by way of example only, when a checksum does not match a previous checksum or when a hash of the data does not match with a previous hash of the data. Alternatively, if a sector or other portion of a HDD cannot be read, the data is determined to be corrupt. Corrupt data can also be identified when the data is accessed or during a scan of the data. Missing data could associate with a hard drive failure, a system failure, a software error or bug that deletes or overwrites data, or the like.

A storage system may be configured to include a cache. A collection of storage devices (e.g., hard disk drives (HDDs)) can be provided with a solid-state drive (SSD) cache. Traditionally, caches were relatively small memory buffers containing only the most recently accessed items. But as the use of fast, persistent storage for caching has increased, the size of caches has grown tremendously and a cache can contain a sizable percentage of the data stored in the underlying storage system as previously stated. For example, a SSD cache can store a significant portion (e.g., 5-10%) of the underlying data/or and metadata of the associated storage system. The cache typically contains higher-value data because the data stored in the cache is, by way of example only, frequently used or recently used.

In accordance with embodiments of the invention, caches (including larger caches) can both increase the performance of a computer system and improve the reliability of the computer system. For example, if data (e.g., data blocks or segments) become corrupted in the storage system, it is possible to check the cache to see if the corrupted data can be recovered from the cache.

When corruption happens in the storage system, the corruption can affect anywhere from a single bit to large regions of data to an entire HDD. Because the cache may contain a valid copy of the missing or corrupted data, the cache can be used to recover data that has become corrupted. If the missing or corrupted data is not present in the cache, then another recovery method may be employed.

For example, a background storage process may detect corrupted data in the storage device or in a storage system. When the corrupted data is detected, the background storage process can query the cache to try to recover the corrupted data. The cache can be queried even if the data is stored in a redundant way such as with a RAID, replication, or with backups to secondary systems, because retrieving a copy from cache may be faster and more efficient. Embodiments of the invention may be used as part of a larger backup and recovery system.

Corrupted data may also be detected during a read operation. In this case, the cache may not have a valid copy of the corrupted data because the read operation may have queried the cache first. However, the corrupted data may be over a larger region than just that segment or block associated with the read request. Thus, a larger corruption scan and recovery operation can be done, leveraging the cached data for recovery. In other words, some of the corrupted data in the storage system that was not necessarily referenced in the read request may exist in the cache and can be used for data recovery purposes.

In another example, depending on how storage units are packed and referenced, attempting to recovery corrupted data from a cache may require walking other data structures to find out how to reference the valid copy of the lost or corrupted data. For instance, in a de-duplicating system that associates a fingerprint with a chunk or other portion of the data, the location of the corrupted data may be known. However, the fingerprint of the corrupted data (or portions thereof) may not be known. A fingerprint may be, by way of example and not limitation, a hash of the underlying chunk or data. As a result, it may be necessary to walk a fingerprint index to determine the fingerprints needed to query the cache for the corrupted data. Because the index maps from fingerprint to location, the mapping can be reversed and the known location of the corrupted data can be used to identify the fingerprint. Once the fingerprint is determined, the fingerprint serves as a key for accessing the cache.

In another example, if the corrupted data (or data blocks) are not found in local caches the search can be expanded to other caches, such as the caches of clients or peer storage servers that may have cached a copy of the corrupted data before it became corrupted.

Because caches typically contain the most frequently used data, the relevance or importance of the data in the cache may be high, thus improving the chance of recovering important data that has been corrupted. In some cases, such as RAID, it may be faster to retrieve a copy of a corrupted segment directly from the cache than to read all the stripe elements and perform a RAID reconstruction. In a high availability fail-over case, the perceived fail-over latency can be reduced if the failed node's cache is always available to the auxiliary node and can service requests while the fail-over is being performed. In another example, if a file system has bugs or errors, such as if the garbage collection process accidentally deletes valid data, the cache can be queried to recover the accidentally deleted data.

Embodiments of the invention relate to recovering corrupted or missing data in a storage device or in a storage system, which may include multiple storage devices. As previously discussed, corrupted or missing data refers to, by way of example and not limitation, data that is stored incorrectly (e.g., one or more bits that were written incorrectly). Corrupted data may also refer to a hardware failure or to data that is affected by the hardware failure. When corrupted data is recovered from the cache, the data from the cache can be re-written to the same location or written in a new location or written in accordance with the operating system or operating parameters of the storage system.

Figure 2:
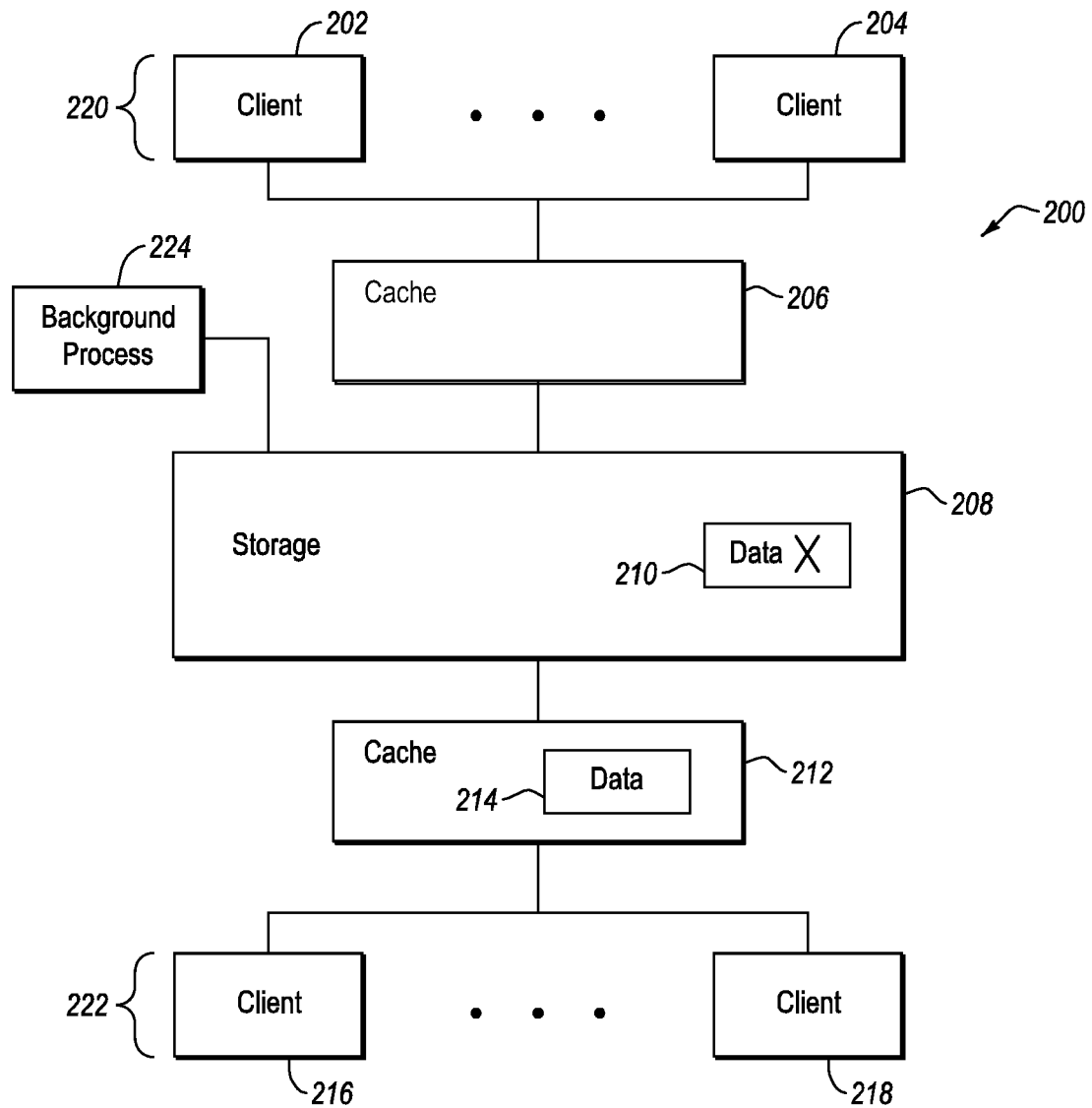
FIG. 2 is another example of a computing system in which corrupted data can be recovered from a cache.

FIGS. 1 and 2 illustrate that embodiments of the invention can be implemented in varying computing environments or systems including, but not limited to, high availability systems, datacenters, local area networks, wide area networks, or the like or any combination thereof. The computing systems can range from single devices to data centers. Generally, a storage system includes one or more storage devices on which data are stored. The storage device can be local storage, network based storage, or the like or any combination thereof. In one example, the storage may include one or more hard disk drives (HDDs) that store data magnetically. However, embodiments of the invention are not limited to magnetic based storage devices.

To improve performance, the computing systems discussed herein may also include one or more caches. The caches can be arranged in parallel or hierarchically or with multiple caching levels. In one example, the cache includes memory such as flash memory or other solid state memory such as a solid-state drive (SSD) that allows data to be accessed more quickly than from a hard disk drive. The cache may include volatile and/or non-volatile memory. In one example, the cache may be large, for example as large as 5-10% of the underlying storage. However, the cache size can have a greater or smaller size. Clients that access the data stored on the storage devices or in the cache include smartphones, tablet devices, desktop computers, server computers, virtual machines, processes, threads, or the like or any combination thereof.

FIG. 1 illustrates an example of a computing environment for system 100. The system 100 may represent a single machine and can also represent a network. The system 100 includes a client 102 that is able to communicate (e.g., perform at least read and/or write operations) with a cache 104 and/or with a storage device 106. The communication between the client 102, the cache 104 and the storage device 106 may occur over a network and may include wired and/or wireless communications.

The cache 104 can be accessed more quickly than the storage device 106. As a result, the cache 104 can accelerate the overall performance of the system 100 by caching data. In one example, the cached data includes, but is not limited to, frequently accessed data (which may include metadata), recently accessed data, or other data that is likely to be required by the client 102.

FIG. 1 also illustrates data 108 and data 110 stored in the cache 104 and data 112 and data 114 stored in the storage system 106. The data 108 and the data 112 have the same identifier 118 and the data 110 and the data 114 have the same identifier 116. Thus, the data 108 is a valid copy of the data 112 and the data 110 is a valid copy of the data 114. The data 108 and the data 110 may be referred to as valid copy 108 and valid copy 110.

For example, a request for data 112 may be initiated by the client 102. If the requested data 112 is not in the cache 104, then the data 112 is retrieved from the storage device 106. The data 112 may then be stored in the cache as data 108 since the data 112 was recently accessed. Similarly, the data 114 in the storage device 106 may be stored in the cache as data 110.

Over time, the client 102 may use the data 108 and 110 for various applications. The data 108 and 110 may remain in the cache 104 even after the client 102 is finished with the data. As a result, a subsequent request for the data 108 and 110 will access the data from the cache 104 and a read access to the storage device 106 can be avoided. The data 108 and 110 may include, but are not limited to, documents, image data, email, application data, executable code, metadata, storage blocks, chunks, or the like or any combination thereof or portion thereof.

In addition to improving the performance of the system 100, embodiments of the invention can improve the reliability of the system 100. Embodiments of the invention use the cache 104 to recover data that may be missing or that has become corrupted in the storage device 106. For example, when it is discovered that the data 114 is corrupted (as indicated by the "X"), the cache 104 may be evaluated or searched to determine if a valid copy 110 of the data 114 exists in the cache 104. In FIG. 1, the valid copy 110 of the data 114 exists in the cache 104. The valid copy 110 can then be used to recover the data 114. Stated differently, the data 110 constitutes a valid copy of the corrupted data 114. By writing the data 110 to the storage device 106, the data 114 can be recovered.

The status (e.g., corrupted or not corrupted) of the data 112 or 114 can be determined in different ways. In one example, a background operation or process may be configured to scan the storage device 106 to identify missing or corrupt data. The background operation or process may also scan the cache 104 to determine whether the data in the cache 104 is corrupted. If corrupted data is discovered in the cache, the data is marked as invalid, or evicted from the cache. The data may then be reloaded into cache from the storage system 106. Alternatively, the data may not be reloaded into the cache until it is requested again.

In another example, the corrupted data may be discovered when a read operation is performed. Because the cache 104 is typically queried before the storage device 106, the requested data likely does not exist in the cache 104. However, because data other than the requested data may be corrupted (e.g., the corruption may not be limited to the specifically requested data and may affect a larger area of the storage device 106), the cache 104 may be queried for other data such as data around the requested data in the storage device 106. For example, if the data is stored in a container, other data in the same container may be evaluated.

Embodiments of the invention, once corrupted data in the storage device 106 is identified, recovers the data from the cache 104 if a valid copy of the corrupted data is present in the cache 104.

FIG. 2 illustrates an example of another computer system 200 in which embodiments of the invention may be implemented. The system 200 is an example of a network (or multiple networks) where data such as data 210 is stored on a storage device 208, which is an example of the storage 106. The system 200 may also include multiple caches, illustrated as cache 206 and cache 212, which are each examples of the cache 104. In this example, the cache 206 is associated with the clients 220 and the cache 212 is associated with the clients 222, which are each examples of the client 102

FIG. 2 illustrates that the data 210 is determined to be corrupt as indicated by the "X". In one example, the corrupted data 210 may be discovered by a background process 224 that is tasked with scanning the storage 208 for corrupted data. Then, the background process 224, which may be included in a backup/recovery application or with another application, may search the cache 206 for the data. In this example, a valid copy of the data 210 does not exist in the cache 206. If another cache exists, such as the cache 212, then the background process 224 may search the cache 212 for a valid copy of the corrupted data. In this example, the data 214, which is a valid copy of the data 210, is present in the cache 212. The data 214 is then recovered or restored to the storage device 208. In some embodiments the cache 212 may be remote from the background process 224 and searching the cache 212 involves network communication such as over a LAN or WAN. In some cases cache 212 may be managed by another process or client and searching cache 212 involves communication with the other process.

Figure 3:
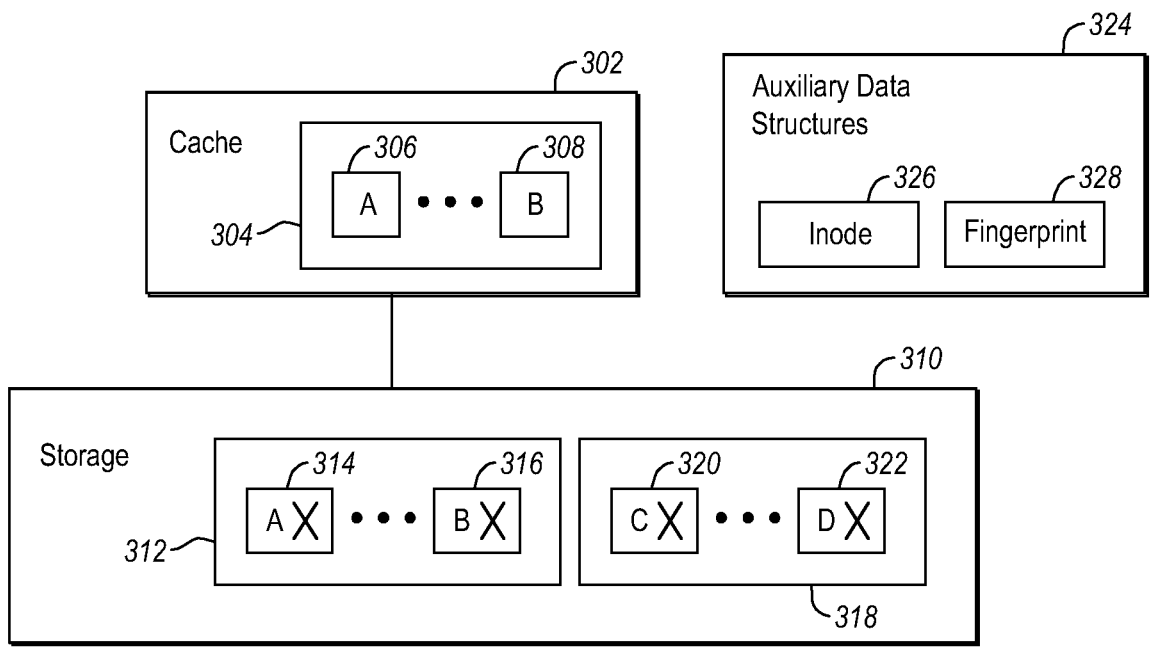
FIG. 3 illustrates an example of the relationships between data in a cache and corrupted data on a storage device and an example of auxiliary data structures that can be used to search the cache for a valid copy of the corrupted data.

FIG. 3 illustrates an example of a cache 302 that caches data retrieved from a storage system 310. FIG. 3 also illustrates an example of auxiliary structures that may be used to search the cache for the corrupted data. FIG. 3 illustrates a cache 302, which is an example of the cache 104, and a storage system 310, which is an example of the storage system 106. The cache 302 includes data 304, which includes data block 306 and data block 308. The storage device 310 stores data 312 and data 318. The data 312 includes data blocks 314 and 316 and the data 318 includes data blocks 320 and 322. In this example, the data 304 is a valid copy of the data 312.

FIG. 3 illustrates that if the data 312 is determined to be missing or corrupted, then the data 312 can be recovered from the valid copy 312 stored in the cache 302. If the data 318 is determined to be missing or corrupted, the data 318 cannot be recovered from the cache 302 because a valid copy of the data 318 is not present in the cache 302.

In one example, the data block 320 is found to be corrupted in response to a read request from a client. Because the corresponding data does not exist in the cache 302, the data block 320 cannot be recovered. However, when data is determined to be missing or corrupted in response to a read request or other data access, an area around the requested data may be examined. If the data blocks 314, 316 and 322 are in the area near or adjacent the data 320 and are corrupted, then the data block 314 and the data block 316 can be restored from the corresponding data blocks 306 and 308 stored in the cache 302. The data blocks 320 and 322 would have to be recovered in another manner.

In one example, when the data block 314 is determined to be corrupted, the location of the data block 314 may be known. Because the data block 314 is corrupted, however, the key to accessing the cache 302 to determine if a valid copy of the data block 320 is stored in the cache 302 may not be known. For example, when the key is a hash or fingerprint, the corrupted data block 314 cannot be used to regenerate the key.

In this case, an auxiliary data structure 324 can be evaluated to identify the key of the corrupted data block 314. An inode 326 and a fingerprint index 328 are examples of auxiliary data structures that can be evaluated to find the key needed to search the cache 302. The auxiliary data structure typically includes a relationship between a key used to access the cache and a location of the data. Example auxiliary data structures include, but are not limited to:

<Hash, location>: The indexing mechanism could be a hash of the content of the data, where the hash could be a SHA1 or other function. The location is the position in cache, storage device, or remote machine, etc.

<(File_ID, offset), location>: The key is a file identifier as well as the offset in the file. The offset may be in bytes, sectors (512 bytes), or other units. The location is the position in cache, storage device, or remote machine, etc. File IDs may be used with a separate table to determine the full file path.

<(LUN, LBA), location>: The key has two parts. The first is a logical unit number (LUN), which is used for block storage and is sometimes referred to as the volume ID. The second part of the key is the logical block address (LBA), which is typically a sector number, where sector 0 is at byte offset 0, and sector 1 is at byte offset 512.

<(Object ID, offset), location>: The cache may hold objects, which have some type of identifier, and the client wants to read from a particular offset within the object. As an example, a client wishes to access object 0xAB at offset 1024.

<key, hash>: As an alternative to the previous options, we could have an extra level of indirection in the index. The client may query based on a key, where a key could be (file, offset), (LUN, LBA), (object, offset), etc., and the result is a hash. A second index is then used to map from hash to location as described in the first example above.

If the location of the data block 314 on the storage device 310 is known, then the auxiliary data structures can be used to find the corresponding key of the data block 314. Once the key is identified, the cache 302 can be accessed using the key to determine if the data corresponding to the corrupted data 314 is present in the cache 302. In this example, the data block 306 is a valid copy of the data block 314 and is present in the cache 302. As a result, the corrupted data block 314 can be recovered from the valid copy in the cache 302.

In another example where the data block 314 is corrupted and an inode 326 is valid, the inode data structure can be traversed to provide a key to query the cache 302. If the i-node is missing, then the cache can be scanned by querying for every incremental file_id:offset (i.e. file_id:0, file_id:4 KB, file_id:8 KB etc.) of the file to determine which portions of the file are present in the cache 302.

Figure 4:
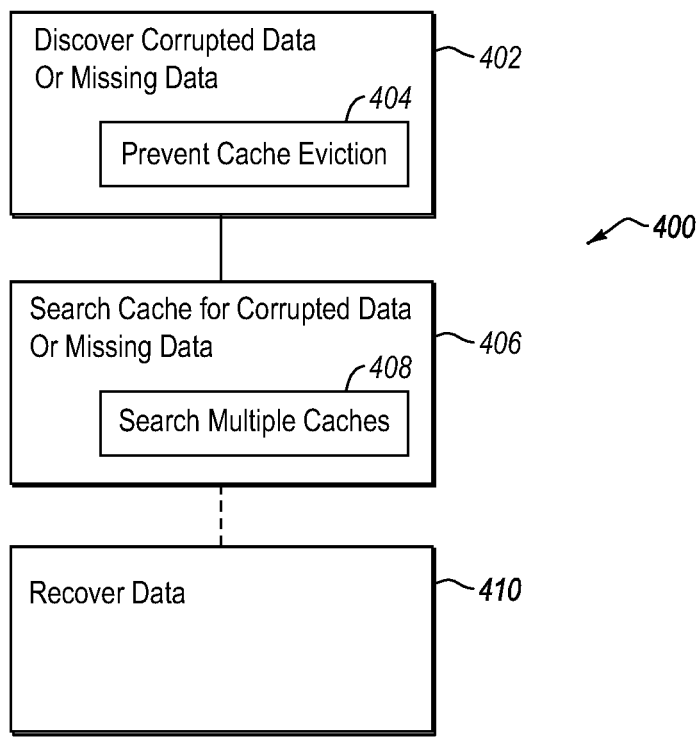
FIG. 4 is an example of a method for recovering corrupted data.

FIG. 4 illustrates an example of a method for recovering data in a computing system. The method typically begins by discovering corrupted data and/or missing data in box 402. Corrupted data and/or missing data can be discovered in various ways. A background operation may scan the storage device when instructed, according to a schedule, or the like. Corrupted or missing data may be discovered during a disk access (e.g., a read operation). Corrupted or missing data may be discovered during a backup operation, a de-duplication operation, a replication operation, or the like.

When corrupted or missing data is discovered, the method continues by preventing data in the cache from being evicted in box 404. By preventing data evictions from the cache, the likelihood of finding a valid copy of the corrupted or missing data increases. Data is prevented from being evicted, in one example, for as long as the recovery operation lasts. Alternatively, evictions may be prevented for a certain period of time.

In box 406, a search is performed in the cache for the corrupted data or for the missing data. In box 408, additional caches, if available, may be searched if the data is not discovered in the cache that is most likely to store a valid copy of the corrupted or missing data. The caches of other clients or replication pairs, or caches of other devices may be searched. In box 410, the data is recovered from the cache if valid data is found in the cache. More specifically, the data is recovered from the cache if a valid copy of the corrupted or missing data is present in the cache. Alternatively, the data can be restored using another recovery mechanism, such as a backup application.

Figure 5:
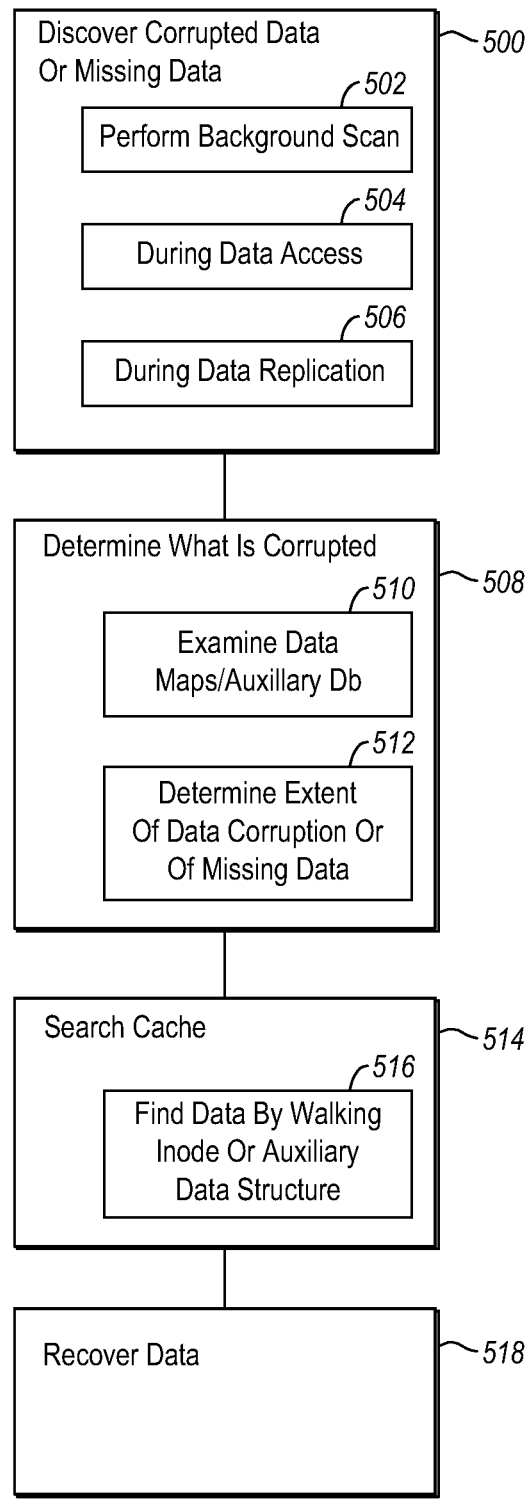
FIG. 5 is another example of a method for recovering corrupted data.

FIG. 5 illustrates another example of a method for recovering corrupted data using cached data. In box 500, corrupted or missing data is discovered. FIG. 5 illustrates that the method may begin whenever corrupted or missing data is discovered, for example, in a storage device or a storage system. FIG. 5 also illustrates that the method does not always begin in the same manner.

For example, corrupted or missing data may be discovered when a background scan of the storage device is performed in box 502. A background scan can be running periodically or continuously or on demand. The method may also begin when data being accessed is determined to be corrupt or missing in box 504. For example, a read operation may determine that the requested data is corrupted or missing. The method may begin in box 506 when corrupted or missing data is discovered during data replication.

In box 508, the extent of the corrupted or missing data may be determined. This can include examining auxiliary structures to determine a key and/or location of the data in box 510. As a result, the key associated with the data can be evaluated such that a relationship between the key and the location can be determined. The evaluation of the auxiliary structures may allow all data affected by the corrupted or missing data to be identified.

The extent of the corruption may also be determined in box 512. This may include examining the data that is near or adjacent (e.g., on the HDD) the corrupted or missing data to determine if the adjacent data is also corrupted or missing. For example, a search for other portions of a file (or data corresponding to an area of a HDD) may be performed to determine if the cache stores other data of a file in addition to the requested data. The keys for all of the corrupted or missing data may be identified and used to search the cache.

In box 514, the cache is searched for the corrupted or missing data using the keys. This may include, as shown in box 516, walking an auxiliary structure or using an inode structure in order to identify the key associated with the location as previously described. The cache can then be accessed using the key.

If a valid copy of the data is found in the cache, the data is recovered from the cache in box 518. Alternatively, the data is recovered using another recovery mechanism.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. As well, such media are examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modulates running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a system that includes a storage device and a flash memory configured as a cache for the storage device, a method for recovering data on the storage device that is not accessible without accessing a backup of the data stored on the storage device, the method comprising:
   determining that a data object stored at a location in the storage device cannot be accessed;
   determining an extent of data missing on the storage device by identifying locations of second inaccessible data objects at least adjacent to the location in the storage device;
   when a key of the data object or keys of the second inaccessible data objects is not known, searching an auxiliary structure that associates keys with locations using the location of the data object and the locations of the second inaccessible data objects to identify keys associated with the location of the data object and the locations of the second inaccessible data objects;
   searching the cache for a valid copy of the data object and the second inaccessible data objects; and
   recovering valid copies of the data object and the second inaccessible objects that are present in the cache.

2. The method of claim 1, further comprising preventing the cache from evicting data when the data object cannot be accessed.

3. The method of claim 1, further comprising determining that the data object cannot be accessed during a background scan of the system.

4. The method of claim 1, further comprising determining that the data object cannot be accessed when attempting to access the data object.

5. The method of claim 1, further comprising determining that the data object cannot be accessed during data replication.

6. The method of claim 1, further comprising performing a read operation on the data object.

7. The method of claim 1, further comprising recovering the valid copies from a backup of the data or by reconstructing the data when the valid copies are not present in the cache.

8. The method of claim 1, wherein the key is one of a hash, a file identifier and an offset, a logical unit number and a logical block address, or an object identifier and offset.

9. The method of claim 1, wherein the data object is inaccessible when the data object is missing, corrupted, cannot be read, or a hash of the data object does not match.

10. In a system that includes a storage device and a flash memory configured as a cache for the storage device, a method for recovering data on the storage device that is not accessible without accessing a backup of the data stored on the storage device, the method comprising:
    determining that a portion of the data stored in the storage device cannot be accessed such that a key for the portion of the data cannot be determined;
    determining a location of the portion of the data stored in the storage device;
    when a key of the portion of the data is not known, accessing an auxiliary structure that associates the key with the location to determine the key of the portion of the data;
    searching the cache for a valid copy of the portion of the data using the key to search the cache, wherein the cache stores data read from the storage device; and
    recovering a valid copy of the portion of the data from the cache after determining that the valid copy is present in the cache.

11. The method of claim 10, further comprising preventing the cache from evicting data when the portion of the data cannot be accessed.

12. The method of claim 10, further comprising determining that the portion of the data cannot be accessed during a background scan of the system.

13. The method of claim 10, further comprising determining that portion of the data cannot be accessed when attempting to access the portion of the data.

14. The method of claim 10, further comprising determining that the portion of the data cannot be accessed during data replication.

15. The method of claim 10, further comprising performing a read operation on the portion of the data.

16. The method of claim 10, further comprising recovering the valid copies from a backup of the data or by reconstructing the data when the valid copies are not present in the cache.

17. The method of claim 10, wherein the key is one of a hash, a file identifier and an offset, a logical unit number and a logical block address, or an object identifier and offset.

18. The method of claim 10, wherein the data object is inaccessible when the portion of the data is missing, corrupted, cannot be read, or a hash of the data object does not match.

19. A non-transitory computer readable medium comprising computer executable instructions configured to perform the method of claim 1.

20. A non-transitory computer readable medium comprising computer executable instructions configured to perform the method of claim 10.

* * * * *